Feb. 11, 1941.  J. P. BARMAN  2,231,460
MULTIPORT VALVE
Filed Aug. 6, 1938   4 Sheets-Sheet 1

Inventor:
John P. Barman
By
McCanna, Wintercorn & Morebach
Attys.

Patented Feb. 11, 1941

2,231,460

UNITED STATES PATENT OFFICE 2,231,460

MULTIPORT VALVE

John P. Barman, Elgin, Ill., assignor to Elgin Softener Corporation, Elgin, Ill., a corporation of Illinois Application August 6, 1938, Serial No. 223,477

46 Claims. (Cl. 137—69)

This invention relates to a new and improved rotary type multiport valve, especially designed and adapted for use with base exchange water softeners, filters, etc.

I am aware of the numerous designs of multiport valves where the rotor is arranged to be lifted, turned, and reseated on a rubber gasket or gaskets. Such valves have been subject to certain serious objections, besides being invariably complicated and expensive to manufacture. It is the principal object of my invention to provide a rotary type multi-port valve in which the rotary part is a cam disk with segmental cam projections on the marginal portion thereof arranged for slidable engagement with the ends of the stems of a plurality of spring-pressed poppet or so-called "whistle" type valves controlling the flow through the ports of the valve in a predetermined manner.

Another important feature of the valve of my invention is the provision of a separate hollow chambered valve plate in which all of the poppet valves are mounted in circumferentially spaced relation, said plate being arranged to be mounted of the stator in proper register with the ports therein and detachably secured in place.

Another important feature is the provision of a valve plate of this kind having ports in the top and bottom walls as well as ports in intermediate walls between chambers in the plate, certain of the poppet valves controlling flow through the upper ports and others through the lower ports and still others through the intermediate ports, the valve plate being arranged to be mounted on the valve stator under a cover to which water or other fluid is supplied under pressure, the top valves controlling flow from inside the cover into the chambers of said valve plate and some of the bottom valves controlling flow for the chambers in the valve plate to and from the ports in the stator, and the rest of the bottom valves controlling flow from inside the cover into the ports in the stator.

A still further important feature of this invention as applied to water softener valves is the embodiment of the brine ejector nozzle in the stator where it is quickly and easily accessible from outside the valve for adjustment and inspection.

The invention will be better understood as reference is made in the following description to the accompanying drawings, wherein—

The same reference numerals are applied to corresponding parts throughout the views.

Figure 1:
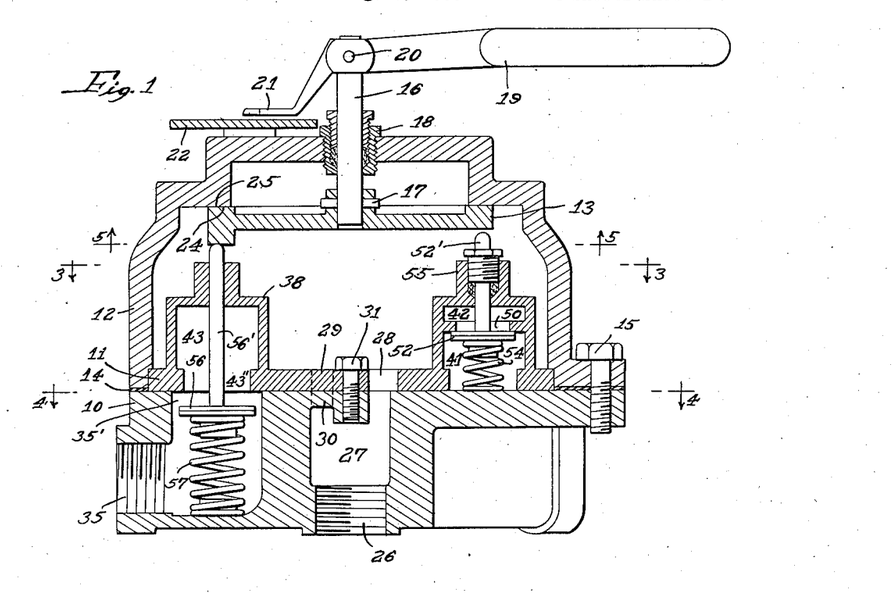
Figure 1 is a vertical section through a valve made in accordance with my invention, taken on the broken line 1—1 of Fig. 3.
Figures 2, 3, 4:
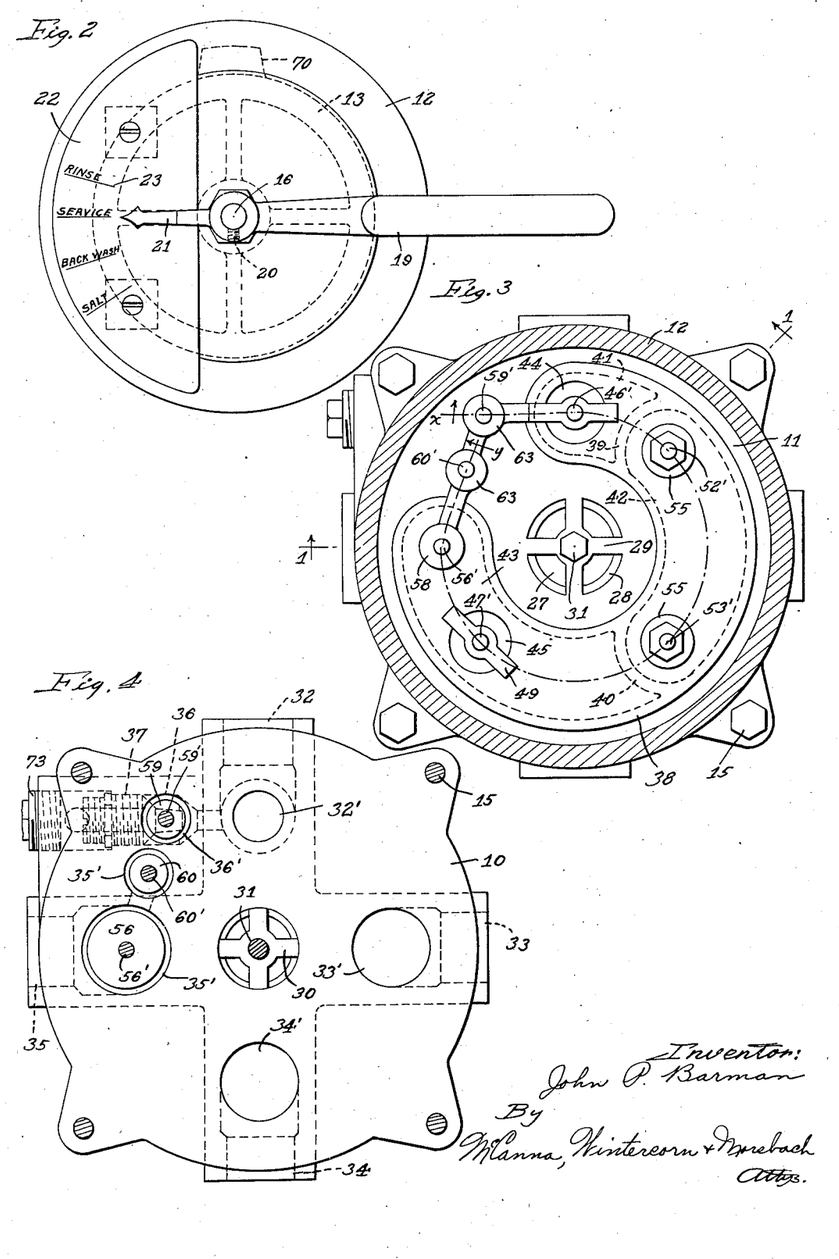
Fig. 2 is a plan view of Fig. 1.
Figs. 3 and 4 are horizontal sections on the correspondingly numbered lines of Fig. 1, the former showing the valve plate in plan view and the latter showing the stator in plan view.
Figure 5:
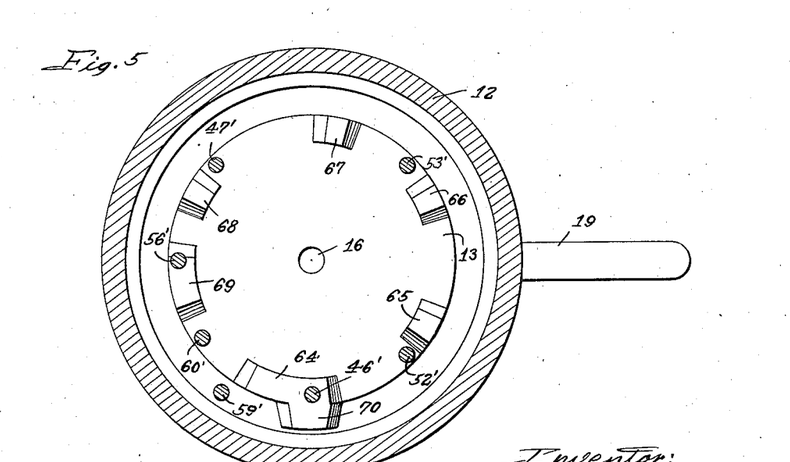
Fig. 5 is another horizontal section on the line 5—5 of Fig. 1, looking upwardly at the bottom of the rotary cam disk.
Figure 6:
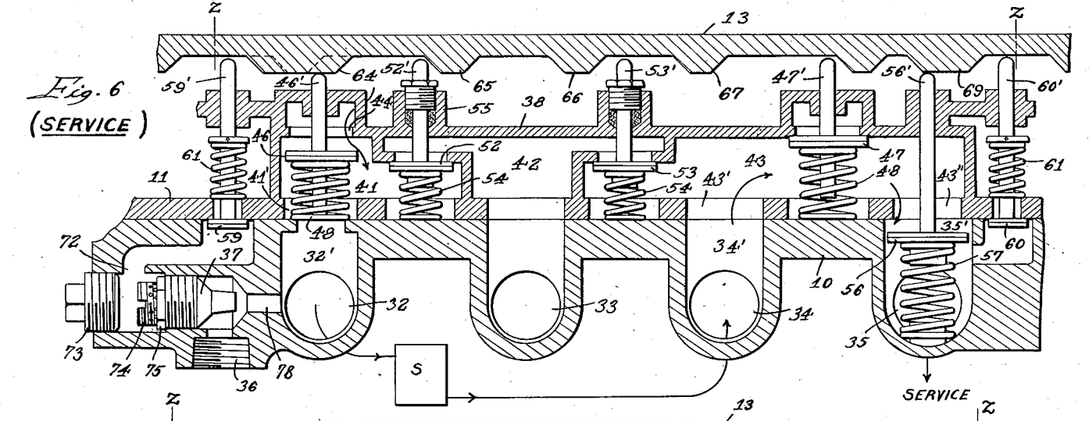
Figs. 6 to 9 are developed sectional views on the line x—y of Fig. 3, illustrating the four operating positions, to wit, service, backwash, salt wash and rinse, respectively.
Figure 7:
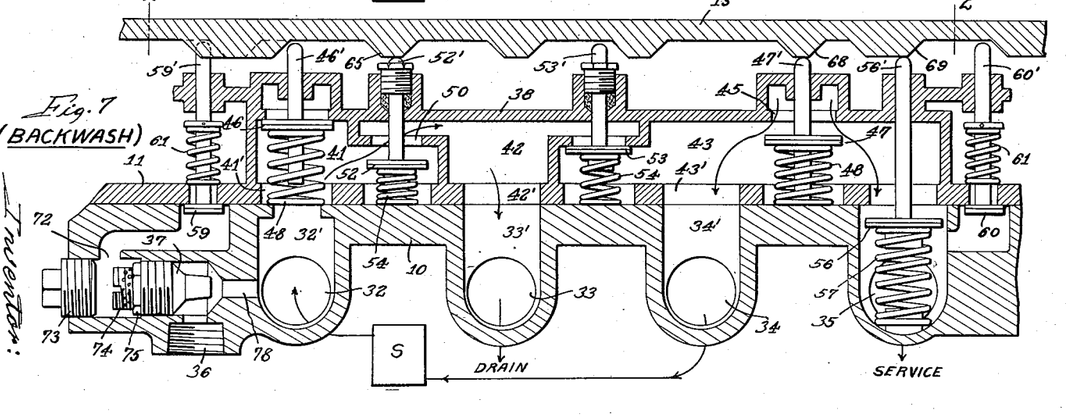

Referring first to Figs. 1 to 5, the reference numeral 10 designates the stator or hollow body part of the valve on which the hollow valve plate 11 is mounted under a cover 12 along with a rotary cam control disk 13. 14 is a gasket sealing the joint between the cover 12 and stator 10, the cover being suitably secured to the stator by means of bolts 15 which, when tightened, serve to compress the gasket 14, in addition to clamping the valve plate 11 firmly in place. The cam disk 13 has a stem 16 secured in the center thereof by means of a cross-pin 17, and this stem extends through a stuffing box 18 in the center of the top wall of the cover 12, and a handle 19 is fastened to the upper end thereof, as at 20, for turning the disk 13 from one operating position to another. A pointer 21 on the end of the handle 19 sweeps over an index plate 22 suitably secured on top of the cover 12 and indicates by reference to the legends or index marks, or both, provided on top of the plate 22, as at 23, the position of the valve. In Fig. 2 the valve is shown in service position, and the three other index marks are for backwash, salt wash and rinse. The cam disk 13 has a flat top surface 24 for slidable engagement with a flat annular surface 25 provided on the inside of the cover 12, and the disk 13 is held yieldingly in engagement with the surface 25 under the spring pressure of the springs of the valves held open by the disk in its different positions of adjustment, as will soon appear.

The stator or body 10 has a central axial threaded hole 26 communicating with the central pressure or fluid supply port 27 which in turn communicates with the inside of the cover 12 through the segmental-shaped openings 28 in the center of the valve plate 11 provided between the arms of the spider portion 29 integral with the plate. The spider portion 29 cooperates with a similar spider portion 30 integral with the stator 10 in the upper end of the port 27, so that a bolt 31 can be passed through a central hole in the spider 29 and threaded in a central hole in the spider 30 to centralize the valve plate 11 with respect to the stator 10 and permit the plate to be turned to a position of exact registration of its ports with the ports in the stator, before the cover is fastened to the stator. The stator has four radial threaded holes in equally circumferentially spaced relation numbered 32 to 35, and these communicate with ports 32' to 35', respectively, opening to the top face of the stator under the valve plate 11. When the present valve is used in connection with a water softener, the holes 32 and 34 will have pipe connections establishing communication therefor with opposite ends of the softener tank, indicated diagrammatically at S in Figs. 6 to 9, while the holes 33 and 35 will receive pipe connections extending to the drain and service system, respectively, as also indicated diagrammatically in Figs. 6 to 9. Still another threaded hole 36 in the stator 10 next to the hole 32 is adapted to receive a pipe connection for delivering brine to the valve from a brine tank indicated diagrammatically at B in Fig. 8. Associated with the hole 36 is a port 36' in the stator 10 opening to the top face thereof under the valve plate 11 for delivering water under pressure to the brine ejector nozzle 37 disposed transversely and in brine ejecting relation to the hole 36. An auxiliary port 35" is provided in the stator next to and in communication with the port 35' and opening to the top face of the stator under the valve plate 11.

The valve plate 11 has a hollow arcuate boss 38 cast integral therewith and provided with partition walls 39 and 40 dividing the interior of the boss into three chambers 41, 42 and 43. The chamber 41 communicates with the port 32' in the stator 10 through port 41' in the bottom wall of the plate 11; the chamber 42 communicates with port 33' through port 42' in the bottom wall of the plate 11, and chamber 43 communicates with ports 34' and 35' through ports 43' and 43", respectively. Two ports 44 and 45 are provided in the top wall of the boss 38 opening into chambers 41 and 43, respectively, and these are normally closed by upwardly seating poppet valves 46 and 47, respectively, under the action of their coiled compression springs 48 which are seated on the stator 10 at their lower ends and bear against the disks of the poppet valves at their upper ends. The valves 46 and 47 have stems 46' and 47' working in guides 49 suitably cast integral with the top wall of the boss 38. Ports 50 and 51 in the partition walls 39 and 40 establish communication between the chambers 41, 42, and 43 as permitted by poppet valves 52 and 53 cooperating with the ports 50 and 51, respectively. Here again, coiled compression springs 54 seating on the stator 10 tend normally to keep the valves seated. These valves have stems 52' and 53', respectively, extended through combination valve stem guides and stuffing boxes 55. The poppet valve 56 in seating upwardly against the bottom of the valve plate 11 under action of its spring 57 seated in the port 35' in the stator 10 shuts off communication between the chamber 43 and port 35' through port 43". The stem 56' of the valve 56 projects through a guide 58 provided therefor integral with the top wall of the boss 38. There are two other poppet valves 59 and 60 which seat upwardly against the valve plate 11 to close ports 59a and 60a communicating with ports 36' and 35", respectively, provided in the stator 10. The coiled compression springs 61 for closing these two valves seat on top of the valve plate 11 at their lower ends and bear against washers 62 at their upper ends fixed to the stems 59' and 60' of said valves. These stems operate in guides 63 cast integral with the guides 49 and 58.

The cam disk 13 has a series of cam projections 64—69 extending downwardly from the marginal portion thereof in circumferentially spaced relation, all on a common radius for cooperation with all of the valve stems with the exception of the stem 59' of the valve 59, which is operable by a separate cam projection 70 extending from the periphery of the disk 13 adjacent one end of the projection 64. With this arrangement, the valve 59 will be opened in only one position of the handle 19, namely, in salt wash position, as shown in Fig. 8.

Figure 8:
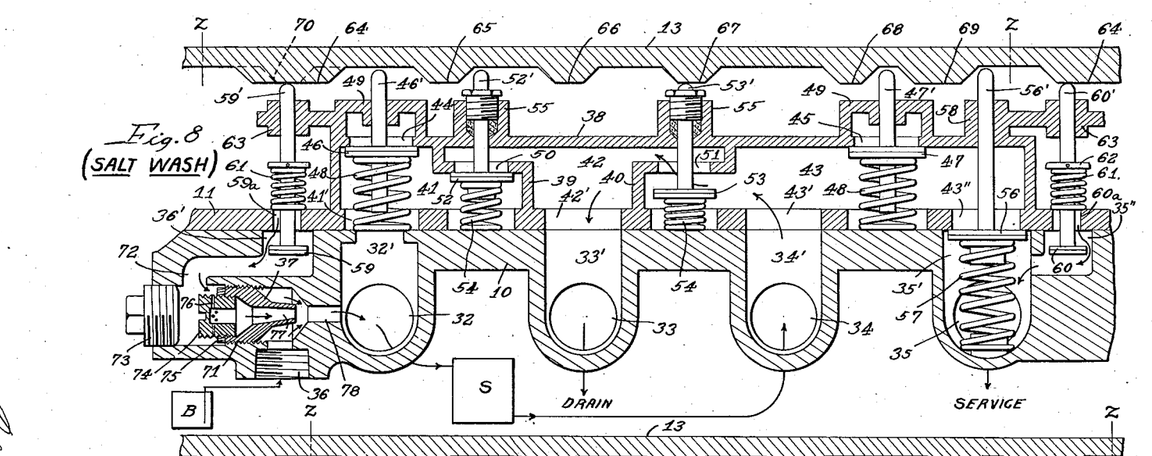
Figure 9:
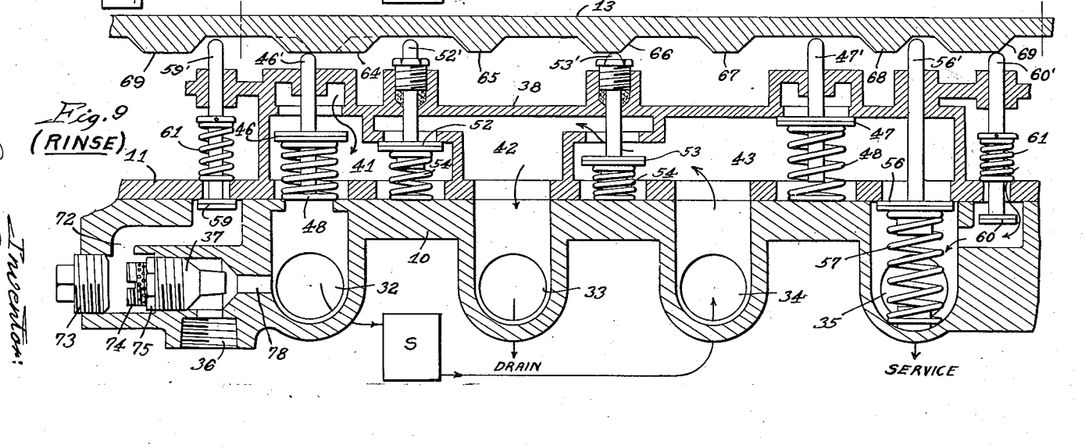

In conclusion, attention is called again to the brine ejector valve 37 which, as best appears in Fig. 8, is threaded in the bore 71 in the stator 10. The forward end of this bore communicates with the upper end of the hole 36 and the other end communicates with the lower end of the port 36', as at 72. A plug 73 closes the remote end of the bore 71 after the nozzle 37 has been threaded in place and its adjusting plug 74 and lock nut 75 have been adjusted and locked in place. The plug 74 has a plurality of radial holes 76 which permit discharge of water through the jet 77 of the nozzle at different rates depending upon the number of holes 76 left uncovered, assuming, of course, that the water is supplied at a substantially constant pressure. The rush of water through the hole 76 from the jet 77 siphons brine from the brine tank B in a well known manner.

In operation, the operator leaves the handle 19 in service position, as in Fig. 2, until the softener requires regeneration. At that time, the handle is first shifted in a counter-clockwise direction to the next position for backwashing the softener S, in order to break up the bed and wash out from the top thereof all accumulated sediment and scum. Then the handle 19 is shifted still further in a clockwise direction to the next position for salt wash in which brine from the brine tank B is forced to flow through the softener S in the same direction as water previously flowed for softening—downwardly, in this case—for the purpose of restoring the base exchange mineral in the softener to its original condition in a manner well understood in this art. After a predetermined amount of brine has been discharged through the softener, as indicated, for example, by the drop in level of the brine in the brine tank B, the operator moves the handle 19 in a clockwise direction to the opposite extreme position for rinsing, in which operation raw water is discharged through the softener tank at a faster rate to rinse out the spent brine and the released calcium and magnesium and prepare the softener for connection again with the service system for softening operation. When the rinse water going to the drain tests soft, the handle 19 can be shifted in a counter-clockwise direction back to the service position. The cam disk 13 in each movement of the handle 19 opens selected valves and closes others to establish the different circuits required for softening, backwashing, salting and rinsing, as follows:

In softening (see Fig. 6), all of the valves are closed with the exception of valves 46 and 56 which are held depressed against the action of their springs by cam projections 64 and 69, respectively. Raw water is delivered from beneath the cover 12 through port 44 to the chamber 41 in valve plate 11, and flows through communicating ports 41' and 32' out through the pipe communicating with hole 32 into the top of the softener tank S for flow downwardly through the mineral therein so as to be softened. The softened water discharged from the bottom of the tank S flows through the pipe communicating with hole 34 in the stator 10 and flows into the chamber 43 through communicating ports 34' and 43' and is discharged from the chamber 43 through communicating ports 43'' and 35' and is delivered to the service system through the pipe communicating with the hole 35 in the stator 10. This flow continues until the water delivered to the service system tests hard, whereupon the softener is ready for regeneration. At the commencement of regeneration, the softener is backwashed for the purpose, previously stated.

In backwashing (see Fig. 7), the valves 47, 52, and 56 are opened by engagement of the cam projections 68, 65 and 69, respectively, with the ends of the valve stems thereof. Raw water from beneath the cover 12 is delivered to the chamber 43 past the opened valve 47 through port 45, and this water flows outwardly through registering ports 43' and 34' and through hole 34 into the bottom of the softener tank S for passage upwardly through the bed of water softening material at a sufficiently rapid rate to break up the bed and wash out from the top thereof all accumulated scum and sediment. The waste water leaving the top of the tank S enters the hole 32 in the stator 10 and flows into chamber 41 in the valve plate 11. The poppet valve 52 being opened, the waste water passes through port 50 into the chamber 42 and thence to the drain through hole 33. During this operation, raw water is also delivered to the service system past the opened valve 56. The extent of movement of the cam disk 13 is indicated by comparison of Figs. 6 and 7 in which the full circumference is marked off between the lines z—z. As soon as the softener has been backwashed sufficiently to prepare the bed of water softening material for the salt wash, the valve is shifted to the salt wash position.

In salt washing (see Fig. 8), the only valves opened are valves 53, 59 and 60, these being held open by engagement on the ends of their valve stems of cam projections 67, 70 and 64, respectively. The only raw water discharged from beneath the cover 12 is that which flows through ports 59a and 60a where the valves 59 and 60 are opened. That flowing through port 59a is for the salt wash, and that flowing through port 60a is for by-passing of raw water to the service system during the salt wash. The raw water passing through port 59a flows through holes 76 in the variable restriction plug 74 of the brine ejector nozzle 37 and is discharged through the jet 77 of the nozzle through hole 78 for passage outwardly through the hole 32 in the stator 10 communicating with the top of the softener tank S. Brine is entrained with this water from the tank B through the hole 36 and flows with the water into the top of the softener tank S for passage downwardly through the bed of water softening material. Spent brine and released calcium and magnesium leaving the bottom of the tank S re-enters the valve through hole 34 in the stator 10 and flows into the chamber 43 and past the opened valve 53 through port 51 into the chamber 42 from which it goes to the drain through the hole 33. This salt wash is continued until a predetermined amount of brine has been passed through the softener, whereupon the valve is shifted to the rinse position.

In rinsing (see Fig. 9), the only valves opened are valves 46, 53 and 60, the valve stems of which are engaged by cam projections 64, 66 and 69, respectively. Raw water from beneath the cover 12 enters the chamber 41 in the valve plate 11 past the open valve 46, and flows out through hole 32 into the top of the softener tank S and passes downwardly through the bed of water softening material to rinse out the brine and released calcium and magnesium. The waste water leaving the bottom of the softener S re-enters the valve through hole 34 and flows into chamber 43 and past the opened valve 53 into chamber 42 from which it goes to the drain through the hole 33. During this rinsing, raw water is by-passed to the service system past the opened valve 60. The rinsing is continued until the outgoing water tests soft, whereupon the valve can be shifted back to softening or service position to resume the normal softening operation illustrated in Fig. 6.

It will be noticed that the only valves having stuffing boxes in connection with the stems thereof are the valves 52 and 53. The reason such provision is made at these points is that the chamber 42 communicates with the drain and the stuffing boxes eliminate the danger of loss of water, whereas, so far as the rest of the valves are concerned, there is no need for stuffing boxes on their valve stems because both ends of the valve stem guides are subject to pressure and there is therefore no danger of leakage at those points, and whatever slight amount of leakage may occur would do no harm.

It should be clear from the foregoing description that I have provided a very serviceable and practical valve of the kind mentioned, and one which can be produced at low cost and will operate with minimum maintenance expense.

It is believed the foregoing description conveys a good understanding of the objects and advantages of my invention. The appended claims have been drawn with a view to covering all legitimate modifications and adaptations.

I claim:

1. In a multiple port valve, a ported body member, a ported chambered valve plate member having some of its ports in communication with body ports, a housing on the body member enclosing said valve plate member, some of the ports of the latter communicating with said housing, valves controlling communication between the housing and chambers in the valve plate member and between chambers in the valve plate member and said body, and a single actuating means for simultaneously operating two or more of said valves.

2. In a multiple port valve, a ported body member, a ported valve plate member having ports in communication with body ports, a housing on the body member enclosing said ported valve plate member, valves controlling communication between the housing and body through the ports in the valve plate member, a single manually operable means for simultaneously operating two or more of said valves, an ejector nozzle in the body member arranged to discharge fluid into one of the ports of the body member, said body member having a passage communicating with the inlet end of the nozzle and extending from another port provided in the body member, said valve plate member having a communicating port provided therein, a valve controlling flow of fluid from the housing through the communicating port into said passage, said valve being operable by the aforesaid manually operable means, and said body having another passage communicating with the outlet end of said nozzle for delivery of fluid thereto from outside the valve to be entrained with the fluid from the nozzle.

3. A valve as set forth in claim 2 including a manually adjustable device in connection with the inlet end of said nozzle for varying the flow through said nozzle, said body member having an opening provided therein through which said device is accessible from without the body member, and a removable closure for said opening.

4. In a multiple port valve, a ported body member, a ported valve plate member having ports in communication with ports of the body member, said body member having a water supply port, a cover on the body member enclosing the valve plate member and communicating with said supply port, said valve plate member having chambers therein separated by partition walls, one or more ports provided in the top wall of the chamber portion of said valve plate, one or more intermediate ports provided in the partition walls, a plurality of valves assembled on the valve plate, some controlling the first mentioned ports of the valve plate, others controlling the second mentioned top ports, and the rest controlling the last mentioned intermediate ports, and a single manually operable means for operating said valves selectively in a predetermined relationship to one another.

5. In a multiple port valve, a ported body member, a ported valve plate member having ports in communication with ports of the body member, said body member having a water supply port, a cover on the body member enclosing the valve plate member and communicating with said supply port, said valve plate member having chambers therein separated by partition walls, one or more ports provided in the top wall of the chamber portion of said valve plate, one or more intermediate ports provided in the partition walls, a plurality of valves assembled on the valve plate, some controlling the first mentioned ports of the valve plate, others controlling the second mentioned top ports, and the rest controlling the last mentioned intermediate ports, said valves being disposed in circumferentially spaced relation, a cam disk substantially concentrically arranged with respect thereto having circumferentially spaced cam projections arranged in different positions of rotary adjustment of the disk to operate said valves in a predetermined relationship to one another, and manually operable means for turning said disk.

6. A valve as set forth in claim 5 wherein all of said valves have spring means normally tending to close the same, said cam disk being arranged to open said valves against the action of said spring means.

7. A valve as set forth in claim 5 wherein each of said valves has spring means normally tending to move the same in one direction and said cam disk is arranged to operate said valves in the opposite direction.

8. In a valve as set forth in claim 4 wherein all of said valves have stems projecting through packingless guides provided on the valve plate member, and wherein one of the chambers of the valve plate member communicates with a port in the body member communicating with the atmosphere, the valve stems of the one or more valves controlling communication with said chamber having packing means for preventing leakage through the guides therefor into said chamber from inside the cover.

9. In a multiple port valve, the combination of a ported body member having a central pressure port, a circular ported valve plate member superimposed on the body member with ports in register with ports of the body member and having a central port registering with the pressure port, a cover for the body member arranged to clamp the valve plate member in position when secured to the body member, means for detachably securing the cover to the body member, a circular rotary cam disk having a profiled marginal lower face in substantially concentric relation with the valve plate member, an actuating stem for said disk extending through an opening in the cover, manually operable means for turning said stem, and a plurality of spring pressed poppet valves mounted on the valve plate controlling flow through the ports thereof and having stem portions slidable in guides provided therefor on the valve plate member and extending toward and engaging the profiled marginal bottom face of the cam disk whereby said valves are arranged to be operated against the action of their spring means in a predetermined relation to one another in different positions of rotary adjustment of said disk.

10. A valve as set forth in claim 9 including a spider portion in the pressure port of the body member, a spider portion on the valve plate member in the central ports thereof, and fastening means cooperating with said spider portions for detachably securing the valve plate member to the body member.

11. A valve as set forth in claim 9 including a spider portion in the pressure port of the body member, a spider portion on the valve plate member in the central port thereof, and a single fastener cooperating with said spider portions centrally with respect to said valve plate member for detachably securing the latter to the body member, the valve plate member being rotatably adjustable with respect to said fastener to accurately register the ports in the valve plate member with the ports in the body member.

12. A multiple port valve comprising a multi-ported body member, a cover therefor providing a chamber therein, a multi-ported valve plate member under said cover having ports in register with ports in the body member, poppet valves having stems slidably mounted in guides on the valve plate member and projecting into the aforesaid chamber, coiled compression springs normally tending to move the valves in one direction and arranged to be compressed between the valves and the body member, means for detachably securing the cover and valve plate member to the body member so as to keep the spring compressed, and a manually operable cam means cooperating with the ends of all of said valve stems in the aforesaid chamber for operating said valves in a predetermined relationship to one another against the action of the aforesaid spring means.

13. A multiple port valve comprising a multi-ported body member, a multi-ported valve plate member having ports in register with ports in the body member, poppet valves having stems slidably mounted in guides on the valve plate member, coiled compression springs normally tending to move the valves in one direction and arranged to be compressed between the valves and the body member, a cover for said body member enclosing the valve plate member, means for detachably securing the cover member to the body member with the valve plate member clamped therebetween and the springs compressed between the valve plate member and the body, and a cam means operatively associated with the ends of all of said valve stems inside the cover for operating the valves in a predetermined relationship to one another against the action of said spring means.

14. A valve as set forth in claim 9, including an annular bearing surface provided on the lower face of the cover arranged to be rotatably engaged by an annular bearing surface on the top face of the circular rotary cam disk.

15. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating with the aforesaid passages in the body and also adapted to communicate with the zuid chamber in the cover, valve means controlling communication between one of said chambers and one of said passages, other valve means controlling communication between one of said chambers and said fluid chamber in the cover, and a single actuating means for operating both of said valve means in a predetermined relationship to one another to establish different predetermined circuits through the multi-port valve.

16. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating with the aforesaid passages in the body and also adapted to communicate with the fluid chamber in the cover, valve means controlling communication between said chambers, other valve means controlling communication between one of said chambers and the fluid chamber in said cover, and a single actuating means for operating both of said valve means in a predetermined relationship to one another to establish different predetermined circuits through the multi-port valve.

17. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating with the aforesaid passages in the body and also adapted to communicate with the fluid chamber in the cover, valve means controlling communication between said chambers, other valve means controlling communication between one of said chambers and one of said passages, and additional valve means controlling communication between one of said chambers and said fluid chamber in the cover, and a single actuating means for operating all of said valve means in a predetermined relationship to one another to establish different predetermined circuits through the multiport valve.

18. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating with the aforesaid passages in the body and with the fluid chamber in the cover, valve means controlling communication between said chambers, other valve means controlling communication between at least one of said chambers and at least one of said passages in the body, and a single actuating means for operating both of said valve means in a predetermined relationship to one another to establish different predetermined circuits through the multiport valve.

19. In a multiport valve, the combination of a ported body member, a ported chambered valve plate member having some of its ports in communication with the body ports, a housing on the body member enclosing said valve plate member, some of the ports of the latter communicating with said housing, the rest of the ports in said valve plate member being adapted to establish communication between the chambers therein, valves controlling communication between the housing and chambers in the valve plate member, between chambers in the valve plate member, and between chambers in the valve plate member and said body, and a single actuating means for simultaneously operating two or more of said valves.

20. In a multiport valve, the combination of a body having a plurality of passages provided therein adapted to be connected with conduits for conducting fluid to and from said valve, a housing on said body member providing a fluid chamber therein to which fluid is adapted to be supplied by another conduit, means providing a plurality of chambers communicating with the passages in said body and adapted to communicate also with said fluid chamber in said housing, valves controlling communication between said chambers and between said chambers and the fluid chamber in the housing, a single actuating means for operating said valves in a predetermined relationship to one another to establish different predetermined circuits through the multi-port valve, an ejector nozzle in a chamber provided in said body and arranged to discharge fluid into one of the passages in said body, and a valve for controlling communication between the nozzle chamber on the inlet side of the nozzle and the fluid chamber in said housing, said valve being also operable by the aforesaid single actuating means, said body having an opening provided therein adjacent the outlet end of said nozzle for delivery of fluid from outside the multiport valve to be entrained with the fluid discharged from the nozzle.

21. A multiport valve as set forth in claim 20, wherein at least one of the first-mentioned valves controls communication between one of said plurality of chambers and one of the first-mentioned passages in said body, said valve being operable by said single actuating means.

22. A multiport valve as set forth in claim 20, wherein at least one of the first-mentioned valves controls communication between one of said plurality of chambers and one of the first-mentioned passages in said body, said valve being operable by said single actuating means, and wherein said body includes a by-pass passage communicating with the last named passage in the body, and said multiport valve includes a valve controlling communication between said by-pass passage and the fluid chamber in said housing, said valve being also operable by the single actuating means.

23. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating with the aforesaid passages in the body and also adapted to communicate with the fluid chamber in the cover, valves controlling communication between certain of said chambers and the fluid chamber in said cover, another valve for controlling communication between one of said plurality of chambers and a passage in said body, said body having a by-pass passage communicating with the last named passage, a valve controlling communication between said by-pass passage and the fluid chamber in said cover, and a single actuating means for simultaneously operating two or more of said valves.

24. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating with the aforesaid passages in the body and also adapted to communicate with the fluid chamber in the cover, valves for controlling communication between certain of said chambers and the fluid chamber in said cover, other valves for controlling intercommunication between chambers of said plurality of chambers, another valve for controlling communication between one of said plurality of chambers and a passage in said body, said body having a by-pass passage provided therein communicating with said last-named passage, a valve controlling communication between the by-pass passage and the fluid chamber in said cover, and a single actuating means for simultaneously operating two or more of said valves.

25. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating with the aforesaid passages in the body, valves controlling communication between chambers of said plurality of chambers, a valve controlling communication between one of said plurality of chambers and one of said passages in said body, said body having a by-pass passage communicating with the last-named passage, a valve controlling communication between the by-pass passage and the fluid chamber in said cover, and a single actuating means for simultaneously operating two or more of said valves.

26. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating with the aforesaid passages in the body and also adapted to communicate with the fluid chamber in the cover, valves controlling communication between said chambers and said passages and between said chambers and said fluid chamber in the cover, a by-pass passage communicating with one of said passages in the body, a valve controlling communication between the by-pass passage and the fluid chamber in the cover, an ejector nozzle in said by-pass passage arranged to discharge fluid into the passage in said body, said body having an opening communicating with the by-pass passage adjacent the outlet end of the nozzle for delivery of fluid from outside the multi-port valve to be entrained with the fluid from the nozzle, and a single actuating means for simultaneously operating two or more of said valves.

27. A multiport valve as set forth in claim 26, wherein certain of the first-mentioned valves also serve to control communication between chambers of said plurality of chambers.

28. A valve as set forth in claim 20, including a manually adjustable device in connection with the inlet end of said nozzle for varying the flow through said nozzle, said body member having an opening provided therein through which said device is accessible from without the body member, and a removable closure for said opening.

29. A valve as set forth in claim 26, including a manually adjustable device in connection with the inlet end of said nozzle for varying the flow through said nozzle, said body member having an opening provided therein through which said device is accessible from without the body member, and a removable closure for said opening.

30. In a multiport valve, the combination of a body having passages provided therein for connection with conduits for conducting fluid to and from the valve, a cover on said body providing a fluid chamber therein to which fluid is adapted to be supplied by another conduit, means between the body and cover providing a plurality of chambers communicating on one side with the aforesaid passages in the body and on the opposite side with the fluid chamber in the cover, whereby to establish different fluid circuits through the valve depending upon how said chambers are interconnected, a plurality of valves controlling intercommunication between said chambers, and a single actuating means for operating said valves in a predetermined relationship to one another to establish different circuits through the multi-port valve.

31. In a multiport valve, the combination of a body having passages provided therein for connection with conduits for conducting fluid to and from the valve, a cover on said body providing a fluid chamber therein to which fluid is adapted to be supplied by another conduit, means providing a plurality of interconnected chambers communicating on one side with the aforesaid passages in the body and on the opposite side with the fluid chamber in the cover, and valve means between the body and said plurality of chambers to control flow therebetween to establish different circuits through the multi-port valve.

32. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating on one side with the aforesaid passages in the body and on the opposite side with the fluid chamber in the cover, valve means between the body and said plurality of chambers to control flow therebetween, a by-pass passage provided in said body to establish communication between one of the passages therein and the fluid chamber in the cover, valve means for opening and closing said by-pass passage, and a single actuating means for operating both of said valve means in a predetermined relationship to one another to establish different predetermined circuits through the multi-port valve.

33. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating with the aforesaid passages in the body and also adapted to communicate with the fluid chamber in the cover, valve means controlling communication between one of said chambers and one of said passages, other valve means controlling communication between said chambers and said fluid chamber in the cover, a by-pass passage provided in said body to establish communication between one of the passages therein and the fluid chamber in the cover, valve means for opening and closing said by-pass passage, and a single actuating means for operating all of said valve means in a predetermined relationship to one another to establish different circuits through the multi-port valve.

34. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating with the aforesaid passages in the body and also adapted to communicate with the fluid chamber in the cover, valve means controlling communication between said chambers, other valve means controlling communication between said chambers and said passages, and additional valve means controlling communication between said chambers and said fluid chamber in the cover, a by-pass passage provided in said body to establish communication between one of the passages therein and the fluid chamber in the cover, valve means for opening and closing said by-pass passage, and a single actuating means for operating all of said valve means in a predetermined relationship to one another to establish different circuits through the multi-port valve.

35. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating on one side with the aforesaid passages in the body and on the opposite side with the fluid chamber in the cover, valve means controlling flow from the fluid chamber through said plurality of chambers and said body passages to establish different circuits through the multi-port valve, an ejector nozzle in the body member arranged to discharge fluid into one of the aforesaid body passages, said body member having another passage communicating with the inlet end of the nozzle for supplying fluid from the aforesaid fluid chamber, and valve means controlling flow of fluid through the latter passage, said body having still another passage provided therein communicating with the outlet end of said nozzle for delivery of fluid thereto from outside the multi-port valve to be entrained with the fluid from the nozzle.

36. A valve as set forth in claim 35, including a manually adjustable device in connection with the inlet end of said nozzle for varying the flow through said nozzle, said body member having an opening provided therein through which said device is accessible from without the body member, and a removable closure for said opening.

37. A multiport valve as set forth in claim 35, wherein the body has a by-pass passage provided therein for connecting one of the body passages with the fluid chamber, said multi-port valve including valve means controlling the opening and closing of said by-pass passage.

38. In a water softener multiported valve adapted for use with a water softener tank containing water softening material having means for supplying hard water to the tank and delivering soft water therefrom, said valve comprising a single valve body adapted to be connected with said means and incorporating a plurality of valves in circumferentially spaced relation for controlling communication between the softener tank and a source of hard water supply in softening and regeneration and to establish communication between the tank and a drain outlet during regeneration, a cam disc rotatably mounted with respect to said valve body in operative relation with all of said valves and adapted to operate different valves selectively in different positions of rotation of the disc, each of said valves having a stem part yieldable under pressure of the cam disc in the operation of the valve, a cover on said body for enclosing said stems and cam disc and for conducting water between said valves, and a single manually operable means for turning said disc operatively connected therewith from outside said cover.

39. In a multiport valve, the combination of a body having passages provided therein for connection with conduits for conducting fluid to and from the valve, a cover on said body providing a fluid chamber therein to which fluid is adapted to be supplied by another conduit, means between the body and cover providing a plurality of chambers communicating on the one hand with the aforesaid passages in the body and adapted to communicate on the other hand with the fluid chamber in the cover, whereby to establish different fluid circuits from the fluid chamber in the cover through the valve depending upon how said plurality of chambers are connected with said fluid chamber, a plurality of valves controlling communication between the fluid chamber and said plurality of chambers, and a single actuating means for operating said valves in a predetermined relationship to one another to establish different circuits through the multi-port valve.

40. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers through which communication is established differently between the aforesaid passages in the body depending upon how said chambers are interconnected, valve means controlling intercommunication between said chambers, an ejector for discharging fluid into one of the aforesaid body passages, means for delivering fluid to said ejector from outside the multi-port valve to be entrained with the fluid from said ejector, valve means controlling the supply of fluid to said ejector from the fluid chamber in the cover, and a single actuating means for operating said valve means in a predetermined relationship to one another to establish different circuits through the multi-port valve.

41. A multiport valve as set forth in claim 40, including another valve means for controlling the delivery of fluid to another of the passages in the body from the fluid chamber in the cover, said valve means also arranged to be operated by said single actuating means in a predetermined relationship to the other valve means.

42. In a multiport valve, the combination of a body having passages provided therein for connection with conduits for conducting fluid to and from the valve, a cover on said body providing a fluid chamber therein to which fluid is adapted to be supplied by another conduit, means establishing intercommunication between the passages in said body independently of the fluid chamber in said cover, valve means controlling communication between the last-mentioned means and one of the passages in the body, other valve means controlling the delivery of fluid to the last-mentioned passage from the fluid chamber in the cover, and a single actuating means for operating said valve means in a predetermined relationship to one another to establish different fluid circuits through the multiport valve.

43. A multiport valve as set forth in claim 42, including an ejector for discharging fluid into one of the body passages, means for delivering fluid to said ejector from outside the multiport valve to be entrained with the fluid from the ejector, and valve means controlling the delivery of fluid to said ejector from the fluid chamber in the cover, said valve means arranged to be operated by the single actuating means in a predetermined relationship to the other valve means.

44. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating with the aforesaid passages in the body and also adapted to communicate with the fluid chamber in the cover, valves controlling communication between the fluid chamber in the cover and said plurality of chambers, between the latter chambers, and between the latter chambers and the passages in the body, and a single actuating means for operating said valves in a predetermined relationship to one another to establish different circuits through the multiport valve.

45. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating with the aforesaid passages in the body and also adapted to communicate with the fluid chamber in the cover, valves controlling communication between the fluid chamber in the cover and said plurality of chambers and between the latter chambers, and a single actuating means for operating said valves in a predetermined relationship to one another to establish different circuits through the multiport valve.

46. In a multiport valve, the combination of a body having passages provided therein for connection with conduits for conducting fluid to and from the valve, a cover on said body providing a fluid chamber therein to which fluid is adapted to be supplied by another conduit, means providing a plurality of chambers communicating with the aforesaid passages in the body and also adapted to communicate with the fluid chamber in the cover, valves controlling communication between the fluid chamber in the cover and said plurality of chambers and between the latter chambers and the passages in the body, and a single actuating means for operating said valves in a predetermined relationship to one another to establish different circuits through the multiport valve.

JOHN P. BARMAN.